3,098,881
METHOD FOR THE PREPARATION OF VINYL-ALKALI METAL COMPOUNDS
Bodo K. W. Bartocha, Riverside, Calif., assignor to the United States of America as represented by the Secretary of the Navy
No Drawing. Filed Aug. 26, 1959, Ser. No. 836,310
2 Claims. (Cl. 260—665)
(Granted under Title 35, U.S. Code (1952), sec. 266)

The invention described herein may be manufactured and used by or for the Government of the United States of America for governmental purposes without the payment of any royalties thereon or therefor.

This invention relates to a process for preparing vinyl-alkali metal compounds.

Prior to this invention there was no easy method for preparing vinyl-alkali metal compounds. By old methods vinylsodium could only be synthesized by a very difficult exchange reaction (A. A. Morton et al., JACS, 72, 3785 (1950)) first making amylsodium in n-pentane and then in the next step by a replacement reaction this compound was treated with ethylene to yield vinylsodium. A catalyst had to be used. In another method (D. M. Ritter et al., J. Org. Chem., 23, 750, 1958) only a mixture of vinylsodium and vinylpotassium could be obtained.

The former methods were subject to the disadvantages, among others, that they required a two-step operation and the use of a catalyst. Further, it was necessary to separate the vinyl-alkali metal compounds from the reaction mixture before use as the nature of the reaction products precluded the use of the vinyl-alkali metal compounds in situ. Also, production of a pure product by former methods was highly difficult.

It is, therefore, an object of this invention to provide a simple, economical, one-step process for preparing vinyl-alkali metal compounds.

It is another object of this invention to provide a process for preparing vinyl-alkali metal compounds by a reaction which permits use of the compounds in situ without isolation from the reaction mixture.

In accordance with the present invention vinyl-alkali metal compounds are prepared by reacting the appropriate alkali metal in the form of a metal dispersion in any known dispersion medium with the desired vinyl halide, for example, vinylchloride, vinylbromide or vinyliodide with the aid of tetrahydrofuran. The new method comprises a simple, one-step process in which small or even technical amounts of the vinyl-alkali metal compounds may be prepared. It is not necessary to isolate the compounds for further use as they can be used in situ for reactions in the same medium.

The invention is illustrated by the following examples which are in no way limiting of the inventions.

*Example I*

Vinyllithium was prepared as follows: A dispersion of 13.8 g. (2 mole) of lithium was prepared in white mineral oil (boiling point range 280–380° C.) without the use of a dispersing aid. The heavy thick paste was then diluted with 250–300 ml. of fresh tetrahydrofuran (distilled over $LiAlH_4$), cooled down to about −20° C. and 118.0 g. (1.1 mole) of vinylbromide slowly added dropwise into the metal dispersion with vigorous stirring. The entire reaction was carried out in 3-neck round-bottom flask fitted with a mechanical stirrer, $CO_2$ reflux condenser (allihn type) and a dropping funnel; and a constant stream of nitrogen gas sent through the apparatus to prevent the highly reactive alkali metal dispersion from oxidizing. A dark blue precipitate was formed very soon which reached a gel-like consistency as the reaction proceeded. After completing the addition of the vinylbromide the cooling bath was removed and the reaction mixture was stirred for another half hour. The vinyllithium formed was available for use in situ.

*Example II*

Vinylsodium was prepared as follows: A dispersion of one mole weight of the metal was prepared in tetrahydrofuran by known techniques. The dispersion was then cooled down to −20° C. with vigorous stirring. Maintaining this temperature a steady stream of pure vinylchloride was passed into the dispersion. A dark precipitate formed immediately which consisted of a mixture of the vinylsodium compound and sodium chloride. The vinylchloride stream was stopped when 37 g. (0.6 mole) had been absorbed by the reaction mixture. The yields obtained by this procedure were up to 95% measured on the evolution of ethylene when hydrolyzing the vinylsodium compound with diluted acids. The vinylsodium was available for use in the reaction mixture with isolation.

Vinylpotassium was prepared by a procedure analogous to that described in Examples I and II. All of the compounds were identified by standard analysis procedures. Experimentation showed that the prepared compounds could be used in situ for further reactions with isolating them from the reaction mixtures.

The vinyl-alkali metal compounds may be used in vinylation reactions for the synthesis of vinyl-metal bonds of metals, the vinyl compounds of which are difficult to obtain otherwise. They may be used to prepare vinylated compounds in situations where the Grignard method is not suited. For example, trivinylaluminum cannot be prepared by the Grignard method since a Grignard is formed in ether or tetrahydrofuran thus resulting in the formation of an aluminum-oxygen addition compound (etherate). Since, according to the present invention, the vinyl compounds of lithium, potassium and sodium may be prepared in heptane or other suitable solvent not forming an addition compound with aluminum the synthesis of pure trivinylaluminum is possible. This is also true for the preparation of trivinylboron and trivinylgallium. Trivinylaluminum is useful in the manufacture of propellants as illustrated by the following composition made by conventional compounding techniques: 10 weight percent of trivinylaluminum and the remainder unsymmetrical dimethylhydrazine. The unsymmetrical dimethylhydrazine may be replaced by an equal amount of tetramethyltetrazene or a suitable alkyl tetrazole.

Vinyliodide may be substituted for vinylchloride or vinylbromide in the process of the invention. Other alkene halides than the vinyl halides may be used. For example, any alkene halide corresponding to the formula $CH_{n+2}X$ wherein X is halogen may be used. The lower alkene halides are particularly useful. Other dispersing agents than those disclosed in the illustrative examples may be used. For example, diethyl ether, diglyme, dipropyl ether, dibutyl ether, dioxane, heptane, hexane, pentane, tetrahydropyrane, benzene, toluene and mineral oil may be used. It is essential that the dispersing agent not react with the vinyl-alkali metal compound, as the dispersing agent must furnish an inert reaction medium so that the vinyl-alkali metal compound produced can be used for further reactions without isolation. The reaction temperature range of 0° C. to −40° C. is critical.

It is seen from the above that the invention provides a simple and economical, one-step method for preparing vinyl-alkali metal compounds in pure form in a reaction mixture which permits further use of the compounds without isolation from the reaction mixture.

Obviously many modifications and variations of the present invention are possible in the light of the above teachings. It is therefore to be understood that within the scope of the appended claims the invention may be practiced otherwise than as specifically described.

What is claimed is:
1. The process for preparing vinyllithium which comprises adding vinylbromide to a lithium dispersion in tetrahydrofuran at −20° C. until a dark blue precipitate forms.
2. The process for preparing vinylsodium which comprises adding vinylchloride to a sodium dispersion in tetrahydrofuran at −20° C. until a dark precipitate forms.

References Cited in the file of this patent
UNITED STATES PATENTS

| | | |
|---|---|---|
| 2,623,077 | Croxall et al. | Dec. 23, 1952 |
| 2,914,578 | Nobis | Nov. 24, 1959 |
| 2,925,432 | Drysdale | Feb. 16, 1960 |
| 2,947,793 | Eberly | Aug. 2, 1960 |
| 2,985,691 | Foster | May 23, 1961 |

OTHER REFERENCES

Braude: "Organic Compounds of Lithium," Progress in Organic Chemistry, vol. 3, pages 172–217, Academic Press, Inc., New York.

Anderson et al.: J. Organ. Chem., 23, 750, 1958.
Morton et al.: J.A.C.S., 72, 3785–96 (1950).
Ziegler: Angew Chem., 68, No. 23, 721–29 (1956).
Ritter et al.: J. Org. Chem., 23, 750 (1958).